United States Patent [19]

Silver

[11] Patent Number: 4,740,537

[45] Date of Patent: Apr. 26, 1988

[54] PHOSPHORUS BASED FLAME RETARDANT COMPOSITION FOR REACTION INJECTION MOLDED POLYDICYCLOPENTADIENE

[75] Inventor: Paul A. Silver, Wilmington, Del.

[73] Assignee: Hercules Incorporated, Wilmington, Del.

[21] Appl. No.: 861,214

[22] Filed: May 9, 1986

[51] Int. Cl.$^4$ .................... C08K 3/02; C08K 9/10; C08L 61/10; C08L 32/06

[52] U.S. Cl. .................... 523/200; 523/208; 523/210; 523/220; 524/80; 524/92; 524/371; 524/414; 524/433; 524/469; 524/511; 524/554; 524/706; 524/856

[58] Field of Search ............ 523/200, 208, 210, 220; 524/80, 706, 856, 554, 414, 92, 371, 469, 511, 433

[56] References Cited

U.S. PATENT DOCUMENTS

| | | | |
|---|---|---|---|
| Re. 30,497 | 1/1981 | Raley | 524/414 |
| 4,086,192 | 4/1978 | Raley | 524/583 |
| 4,242,240 | 12/1980 | Cerny et al. | 524/80 |
| 4,400,340 | 8/1983 | Klosiewicz | 524/789 |
| 4,440,880 | 4/1984 | Albanesi et al. | 524/80 |
| 4,458,037 | 7/1984 | Leach | 526/283 |
| 4,471,080 | 9/1984 | Rinaldi et al. | 524/80 |
| 4,481,344 | 11/1984 | Newburg | 526/283 |
| 4,584,149 | 4/1986 | Alfonso et al. | 264/5 |
| 4,607,077 | 8/1986 | Silver et al. | 524/708 |

*Primary Examiner*—Herbert J. Lilling
*Attorney, Agent, or Firm*—William S. Alexander

[57] ABSTRACT

Disclosed is a composition that is polymerizable by contacting it with an olefin metathesis catalyst comprising dicyclopentadiene, red phosphorus, and a brominated aromatic compound selected from the group consisting of decabromodiphenyl oxide, N,N'-ethylene-bis-(tetrabromophthalimide), brominated polystyrene, brominated polyphenylene oxide, tetradecabromodiphenoxy benzene, tetrabromoxylene, and octabromodiphenyl oxide.

18 Claims, No Drawings

PHOSPHORUS BASED FLAME RETARDANT COMPOSITION FOR REACTION INJECTION MOLDED POLYDICYCLOPENTADIENE

This invention relates to a thermoset polymer of dicyclopentadiene (DCPD) made with an olefin metathesis catalyst system. More particularly, it relates to olefin metathesispolymerized DCPD made using a reaction injection molding (RIM) process.

In the typical RIM process, two reactant streams, one or both of which contains DCPD, and each of which contains one part of a two-part olefin metathesis catalyst system, are combined in a mixhead, and this mixture is then injected into a mold where polymerization occurs, forming a thermoset polymer. U.S. Pat. No. 4,400,340 discloses such a method for making a thermoset polymer of dicyclopentadiene (DCPD).

Being a hydrocarbon, the poly(DCPD) has intrinsic flammability and will burn continuously when ignited. Flame retardants are known to have been used in thermoset polymers in general. However, in the case of a thermoset polymer of DCPD made by metathesis catalyzed polymerization, the addition of flame retardants presents specific problems. The highly reactive nature of the catalyst means that only a flame retardant that is catalyst-compatible, i.e., it does not react with the catalyst, is suitable, otherwise the polymerization of DCPD would be inhibited. Furthermore, even if a flame retardant is found that is catalyst-compatible, when RIM processing is used it must also be RIM compatible, i.e., the critical nature of the fluid mechanics of RIM processing suggests that the presence of a flame retardant might cause physical problems in processing, even if it were found to be compatible.

In the face of the problems posed by these two negative variables in the search for a flame retardant for use in a DCPD polymerization using olefin metathesis catalysts, there have been efforts to find a retardant that would not impede polymerization of dicyclopentadiene, and also would be capable of being dispersed in dicyclopentadiene without interfering with the fluid mechanics of RIM processing.

According to this invention, a composition that is polymerizable with an olefin metathesis catalyst is characterized in that it comprises dicyclopentadiene, red phosphorus, and a brominated aromatic compound selected from the group consisting of N, N'-ethylene-bis-(tetrabromophthalimide), brominated polystyrene, decabromodiphenyl oxide, tetrabromoxylene, brominated polyphenylene oxide, octabromodiphenyl oxide and tetradecabromodiphenoxy benzene. The red phosphorus and brominated aromatic compound are solids that contribute flame retardancy to the composition.

Also according to the invention, a method of making a thermoset polymer that comprises the steps of combining a plurality of reactant streams, one of which contains the activator of a metathesis catalyst system and a moderator, a second which contains the catalyst of the catalyst system, and at least one of which contains dicyclopentadiene, to form a reaction mixture, and immediately injecting the reaction mixture into a mold where polymerization occurs, is characterized in that at least one of the reactant streams contains the flame retardants used in the polymerizable composition according to the invention.

In the method of making a thermoset polymer according to the invention, the presence of the flame retardants does not delay or inhibit DCPD polymerization, and the flame retardants are capable of being dispersed in the DCPD monomer to form a slurry that can be pumped through a mixhead into a mold and cured to produce a thermoset polymer throughout which the flame retardants are homogeneously distributed.

Also according to the invention, a thermoset polymer comprising olefin metathesis-polymerized dicyclopentadiene is characterized in that the polymer further comprises the flame retardants used in the method of making a thermoset polymer according to the invention.

The total amount of flame retardants (red phosphorus and brominated aromatic compound) used according to the instant invention is preferably, by weight of the composition or the thermoset polymer, less than about 40%, more preferably less than about 30%. This is because a solids content of greater than 40%, by weight of the composition, tends to interfere with the fluid mechanics of RIM processing.

Red phosphorus is an allotrope of elemental phosphorus having a specific gravity of 2.34, occurring as a violet-red, amorphous powder. The amount of red phosphorus used in accordance with the instant invention is preferably at least about 0.9%, more preferably at least about 1.12%, based on the weight of the composition or the thermoset polymer.

In a preferred embodiment of the instant invention, the red phosphorus is microencapsulated in a polymer, such as a phenol-formaldehyde resin. Microencapsulated red phosphorus useful in accordance with the instant invention is known and commercially available. Microencapsulation is preferred because in instances where the red phosphorus is stored with one of the catalyst components, it prevents direct contact between the red phosphorus and the component, thereby extending storage time. Microencapsulation also advantageously prevents hydrolysis of the red phosphorus to unstable, volatile compounds, such as phosphine.

The brominated aromatic compound useful in accordance with this invention is N, N'-ethylene-bis-(tetrabromophthalimide), brominated polystyrene, decabromodiphenyl oxide, tetrabromoxylene, brominated polyphenylene oxide, octabromodiphenyl oxide, or tetradecabromodiphenoxy benzene. The amount of brominated aromatic compound useful in accordance with the instant invention is sufficient so that the bromine content is preferably at least about 6%, more preferably at least about 11.6%, by weight of the composition or the thermoset polymer. For example, a polymerizable composition of the instant invention having by weight of the composition 13.98% decabromodiphenyl oxide will have an 11.6% bromine content.

Preferably the red phosphorus, or microencapsulated red phosphorus, and brominated aromatic compound useful in accordance with the instant invention have a particle size sufficiently small enough to fit through a 325 mesh sieve, i.e., the preferred particles possess a maximum dimension less than about 44 microns. The preferred particle size insures good fluid viscosity in the polymerizable composition and good homogeneity in the thermoset polymer.

Since red phosphorus can hydrolyze to volatile, unstable compounds, it is preferable that it be kept dry and cool before use, or microencapsulated as described hereinabove.

The process for making a thermoset polymer according to the instant invention is an improvement over known RIM processes as disclosed in U.S. Pat. Nos. 4,400,340, 4,469,809, and 4,485,208, the disclosures of which are incorporated herein by reference. For example, in one embodiment of this invention the flame retardants are incorporated into a RIM process using two DCPD-containing monomer streams, each stream having one component of a WCL$_6$(tungsten chloride)/tri-n-octyl aluminum catalyst as well as a Lewis base moderator. The flame retardants can be incorporated into either or both of the streams. However, due to the high reactivity of the aluminum component, it is preferable not to store the flame retardants with the aluminum components for extended periods of time prior to making the thermoset polymer. The time and apparatus required to mix, inject, cure, and demold the thermoset polymer will be apparent to those skilled in the art as shown in the hereinabove referenced patents. Of course, it will be apparent to those skilled in the art that in a RIM process comprising more than 2 reactant streams, the flame retardants need not be in a stream containing either of the catalyst components. However, it is preferable that the flame retardants be evenly dispersed in the dicyclopentadiene, prior to the blending of the DCPD monomer streams in the RIM mixhead, to insure even distribution of the flame retardant in the thermoset polymer.

Optional additives in this invention are known and include antioxidants, such as 1,3,5-tri-methyl-2,4,6-tris-(3,5-di-tert-butyl-4-hydroxybenzyl) benzene or 2,6-ditertiary-butyl-para-cresol, stabilizers, pigments, and from 0% to about 10% of another polymerizable cycloolefin such as, e.g., norbornadiene, dimethanohexahydronaphthalene, dimethanooctahydronaphthalene, or norbornene. Other optional additives are known, such as disclosed in the heretofore mentioned U.S. Pat. Nos. 4,400,340, 4,469,809, and 4,485,208.

In order to more fully explain the instant invention, the following examples are provided. These examples are intended to be illustrative only, and the instant invention is not limited thereto. All parts and percentages in the examples are by weight, unless otherwise indicated.

EXAMPLE 1

To illustrate the polymerizable composition of the instant invention, the following ingredients are charged into a reaction vessel under a nitrogen sparge: 4.94 parts decabromodiphenyl oxide, 0.48 parts magnesium oxide stabilized, red phosphorus microencapsulated in phenol formaldehyde resin and having, a pH of 9.5–10, a mean particle size of 20–30 microns, and a red phosphorus content of 85%, by weight (available under the trademark AMGARD ™ CRP, from Albright & Wilson, Ltd.), 5.42 parts dicyclopentadiene and 0.22 parts of the phenolic anti-oxidant 1,3,5-trimethyl-2,4,6-tris (3,5-di-tert-butyl-4-hydroxybenzyl)benzene. The mixture is heated under nitrogen to 40° C. with agitation for 18 hours to disperse the solids. The resulting material is packed and capped in plastic jugs for later molding.

EXAMPLE 2

To illustrate the process and thermoset polymer of the instant invention, the following materials are charged into the A-tank of the metering system of a RIM molding apparatus: 4930 g. of a solution of SBR (styrene butadiene rubber) in DCPD (dicyclopentadiene) (6% SBR, 94% DCPD, by weight), and 198 ml. of activator/moderator complex in dicyclopentadiene (activator is 0.91 molar tri-n-octylaluminum and 0.16 molar di-octylaluminum iodide and moderator is 3.2 molar diglyme).

The following materials are charged into the B tank of the metering system of a standard, 2-stream RIM molding apparatus: 2405 g. of a solution of SBR in DCPD, 132 ml. of 0.5 molar tungsten-catalyst in toluene (taken from 2 liter solution of 1 mole of WCL$_6$, 0.25 mole t-butanol, 1.2 moles nonylphenol, and 2 moles of acetyl acetone in toluene), 3500 g. of the polymerizable composition from Example 1, 87 g. of the anti-oxidant octadecyl 3,5-di-tert-butyl-4-hydroxyhydrocinnamate, and 20 ml. of deodorant solution (rose oxide) .

Feed streams from the A and B tanks are fed into a RIM mixhead and immediately injected into molds. Plaques (10"×10"×⅛") are molded from equal volumes of material from the A and B tanks (plaques contain, by weight, 13.82% decabromodiphenyl oxide/1.34% microencapsulated red phosphorus). Samples taken from the plaques are tested according to ANSI/UL-94-1979 and receive a rating of V-O, the best flame retardancy rating defined in the test.

What is claimed is:

1. A composition that is polymerizable by contacting it with an olefin metathesis catalyst comprising dicyclopentadiene, red phosphorus, and a brominated aromatic compound selected from the group consisting of decabromodiphenyl oxide, N, N'-ethylene-bis-(tetrabromophthalimide), brominated polystyrene, brominated polyphenylene oxide, tetradecabromodiphenoxy benzene, tetrabromoxylene, and octabromodiphenyl oxide.

2. The composition of claim 1, further comprising another polymerizable cycloolefin.

3. The composition of claim 1, wherein the red phosphorus is microencapsulated in a phenol-formaldehyde resin.

4. The composition of claim 1, wherein the microencapsulated red phosphorus is stabilized by contact with magnesium oxide.

5. The composition of claim 1, wherein the brominated aromatic compound is decabromodiphenyl oxide.

6. The composition of claim 1, wherein the red phosphorus and brominated aromatic compound have a maximum particle size of about 44 microns.

7. The composition of claim 1, wherein the red phosphorus comprises at least about 0.9%, by weight, of the composition.

8. The composition of claim 1, wherein the bromine content comprises at least about 6%, by weight, of the composition.

9. In a process of making a thermoset polymer that comprises the steps of:
   (a) combining a plurality of reactant streams one of which contains the activator of a metathesis-catalyst system and a moderator, a second which contains the catalyst of the catalyst system, and at least one of which contains dicyclopentadiene and from 0% to about 10% of another polymerizable cycloolefin to form a reaction mixture; and
   (b) immediately injecting the reaction mixture into a mold where polymerization occurs;
the improvement wherein at least one of the reactant streams contains red phosphorus and a brominated aromatic compound selected from the group consisting of decabromodiphenyl oxide, N, N'-ethylene-bis(tetrabromophthalimide), brominated polystyrene, brominated polyphenylene oxide, tetradecabromodiphenoxy benzene, tetrabromoxylene, and octabromodiphenyl oxide.

10. The process of claim 9, wherein the red phosphorus and brominated aromatic compound comprise less than about 40% by weight of the reaction mixture.

11. The thermoset polymer made according to the process of claim 10.

12. A thermoset polymer comprising olefin metathesispolymerized dicyclopentadiene interspersed throughout with red phosphorus and a brominated aromatic compound selected from the group consisting of decabromodiphenyl oxide, N,N'-ethylene-bis(tetrabromophthalimide), brominated polystyrene, brominated polyphenylene oxide, tetradecabromodiphenoxy benzene, tetrabromoxylene, and octabromodiphenyl oxide.

13. The thermoset polymer of claim 12 wherein the red phosphorus is encapsulated in a phenol-formaldehyde resin.

14. The thermoset polymer of claim 13, wherein the microencapsulated phosphorus is stabilized by contact with magnesium oxide.

15. The thermoset polymer of claim 12, wherein the brominated aromatic compound is decabromodiphenyl oxide.

16. The thermoset polymer of claim 12, wherein the red phosphorus and brominated aromatic compound have a maximum particle size of about 44 microns.

17. The thermoset polymer of claim 12, wherein the red phosphorus comprises at least about 0.9%, by weight, of the thermoset polymer.

18. The thermoset polymer of claim 12, wherein the bromine content comprises at least about 6%, by weight, of the thermoset polymer.

* * * * *